(12) United States Patent
Arbore et al.

(10) Patent No.: US 6,654,392 B1
(45) Date of Patent: Nov. 25, 2003

(54) QUASI-MONOLITHIC TUNABLE OPTICAL RESONATOR

(75) Inventors: Mark Arbore, Palo Alto, CA (US); Francisc Tapos, Los Gatos, CA (US)

(73) Assignee: Lightwave Electronics, Mountain View, CA (US)

( * ) Notice: Subject to any disclaimer, the term of this patent is extended or adjusted under 35 U.S.C. 154(b) by 0 days.

(21) Appl. No.: 09/494,747

(22) Filed: Jan. 31, 2000

(51) Int. Cl.$^7$ ................................. H01S 3/10
(52) U.S. Cl. ...................... 372/20; 372/21; 372/22
(58) Field of Search .............................. 372/20, 21, 22

(56) References Cited

U.S. PATENT DOCUMENTS

| | | | |
|---|---|---|---|
| 4,829,532 A | | 5/1989 | Kane ........................... 372/20 |
| 4,914,662 A | * | 4/1990 | Nakatani et al. ............... 372/32 |
| 4,947,398 A | * | 8/1990 | Yasuda et al. ................. 372/29 |

(List continued on next page.)

OTHER PUBLICATIONS

"Continuously–Tunable double resonant optical parametric oscillator", M. Bode, P. Lam, L. Freitag, A tunnermann, H. Bachor, H. Welling, Optics Communication, 148 No. 1–3 p. 117–31, Mar. 1, 1998.
"Single–Frequency low–threshold continuous–wave 3βm periodically poled lithiumniobate optical parametric oscillator"; D. chen, D. Hinkley, J. Pyo, J. Swenson and R. Fields, vol. 15, NO. 6/Jun. 1998/J. Opt. Soc. Am. B.
"Focusing dependence of the efficiency of a singly resonant optical parametric oscillator"; S. Guha; Appl. Phys. B 66, 663–675 (1998).
"Diode–pumped continuous–wave widely tunable optical parametric oscillator based on periodically poled lithium tantalate", M. E. Klein et al; Jun. 1, 1998/ vol. 23. No. 11/ Optics Letters.
"Narrow–linewidth, pump–enhanced singly–resonant paramedics oscillator pumped at 532nm"; K. Schneider, S. Schiller; Appl. Phys. B 65, 775–777 (1997).
"Theory of an optical parametric oscillator with resonant pump and signal"; S. Schiller, K. Schneider, and J. Mlynek; vol. 16, No. 9 /Sep. 1999/ J. Opt. Soc. Am. B.
"Modeling of efficient mode matching and thermal–lensing effect on a laser–beam coupling into a mode–cleaner cavity"; N. Uehara, E. K. Gustafson, M. M. Fejer, and R. L. Byer; Edward L. Ginzton Laboratory, Stanford University, Stanford, CA 94305–4085; Reprinted from Modeling and simulation of higher–power laser systems IV, Feb. 12–13, 1997, San Jose, California.

(List continued on next page.)

Primary Examiner—Paul Ip
Assistant Examiner—Jeffrey Zahn
(74) Attorney, Agent, or Firm—Lumen Intellectual Property Services, Inc.

(57) ABSTRACT

An optical resonator has a piezoelectric element attached to a quasi-monolithic structure. The quasi-monolithic structure defines an optical path. Mirrors attached to the structure deflect light along the optical path. The piezoelectric element controllably strains the quasi-monolithic structure to change a length of the optical path by about 1 micron. A first feedback loop coupled to the piezoelectric element provides fine control over the cavity length. The resonator may include a thermally actuated spacer attached to the cavity and a mirror attached to the spacer. The thermally actuated spacer adjusts the cavity length by up to about 20 microns. A second feedback loop coupled to the sensor and heater provides a "coarse" control over the cavity length. An alternative embodiment provides a quasi-monolithic optical parametric oscillator (OPO). This embodiment includes a non-linear optical element within the resonator cavity along the optical path. Such an OPO configuration is broadly tunable and capable of mode-hop free operation for periods of 24 hours or more.

40 Claims, 3 Drawing Sheets

U.S. PATENT DOCUMENTS

| | | | |
|---|---|---|---|
| 5,134,622 A | 7/1992 | Deacon | 372/21 |
| 5,206,868 A | 4/1993 | Deacon | 372/21 |
| 5,212,584 A * | 5/1993 | Chung | 359/260 |
| 5,296,960 A | 3/1994 | Ellingson et al. | 359/330 |
| 5,499,256 A | 3/1996 | Bischel et al. | 372/28 |
| 5,661,595 A | 8/1997 | Stamm et al. | 359/330 |
| 5,841,570 A | 11/1998 | Velsko | 359/330 |
| 5,889,800 A | 3/1999 | Kafka et al. | 372/20 |
| 5,896,220 A | 4/1999 | Stamm et al. | 359/330 |
| 5,999,547 A | 12/1999 | Schneider et al. | 372/21 |

OTHER PUBLICATIONS

"Continuous–wave total–internal–reflection optical parametric oscillator pumped at 1064 nm"; D. K. Serkland et al.; Jul. 15, 1994/ vol. 19, No. 14/Optics Letters.

"Toward an optical synthesizer: a single–frequency parametric oscillator using periodically poled LiNbO3 "; K. Schneider et al.; Sep. 1, 1999/vol. 22, No. 17/Optics letters.

* cited by examiner

QUASI-MONOLITHIC TUNABLE OPTICAL RESONATOR

STATEMENT REGARDING FEDERALLY SPONSORED RESEARCH OR DEVELOPMENT

This invention was supported in part by grant number NAS5-98055 from the National Aeronautics and Space Administration (NASA). The Government has certain rights in the invention.

FIELD OF THE INVENTION

This invention relates generally to optical resonators. More particularly, it relates to optical frequency converters.

BACKGROUND ART

Optical resonators find use in a variety of laser based optical devices, such as frequency doublers, optical parametric oscillators, mode cleaners, frequency filters, temporal filters and spatial filters. An optical resonator generally comprises two or more mirrors configured to reflect light back and forth over an optical path or around a loop. Light from an external (or pump) light source, such as a laser, builds up a large signal within the resonator when the optical path length matches an integral number of wavelengths of the source light. In order to achieve highly efficient frequency conversion, external resonators can be used to build-up high circulating powers at the pump frequency. Similarly, light can build up from noise when an internal source of optical gain (such as a laser medium or parametric amplifier) is contained within an optical resonator.

Resonators find application in optical parametric oscillators (OPO's). An OPO is a nonlinear device that converts incident photons into photon pairs when optically excited at a power per unit area above a certain threshold. The threshold level is a characteristic of the non-linear material and the resonator. Suitable non-linear materials include Lithium Niobate ($LiNbO_3$), Lithium Tantalate ($LiTaO_3$), Lithium Borate ($LiBO_3$) PPLN, PPLT MgO:PPLN, KTP, PPKTP, RTA, BBO, PPRTA, and the like. OPO's are usually embodied in one of two forms: Either a doubly resonant oscillator (DRO) in which both the generated optical beams are resonated or in a singly resonant oscillator (SRO) in which only one of the generated optical beams is in resonance. Furthermore, non-planar ring oscillator (NPRO)-based pump-resonant OPO's have been demonstrated in several wavelength ranges. (see, e.g., K. Schneider and S. Schiller, "Narrow-linewidth, pump-enhanced singly-resonant parametric oscillator pumped at 532 nm", Applied Physics B 65, 775, (1997), and K. Schneider, P. Kramper, S. Schiller, and J. Mlynek, "Toward an Optical Synthesizer: A Single Frequency Parametric Oscillator Using PPLN", Opt. Lett. 22, 1293, (1997), and D. Chen, D. Hinkley, J. Pyo, J. Swenson, and R. Fields, "Single-Frequency, Low-threshold continuous-wave 3-$\mu$m Periodically Poled Lithium Niobate Optical Parametric Oscillator.")

If the optical path within the resonator changes by a substantial amount (about one wavelength), then the OPO will mode-hop. In order to prevent this, prior art systems have included means to control total optical path length within the cavity. These means often involve controlling the index of refraction of a transmissive material in the optical path. Such means typically change the length of the optical path by changing a temperature of the non-linear element. Unfortunately, changing the temperature of a non-linear material also changes the frequency of maximum optical gain, which is undesirable because this can also induce mode hops. Furthermore, many applications of resonators, such as mode cleaners, frequency filters, temporal filters and spatial filters, do not use a non-linear optical element, or any other intracavity transmissive element.

Alternatively, the optical path length may be changed by moving one of the mirrors with respect to the rest of the optical cavity, e.g. with a piezoelectric element. Typical resonator configurations include discrete, monolithic, semi-monolithic, and quasi-monolithic resonators. In a discrete resonator two or more mirrors are independently mounted to a support structure such as an optical table. The length of the optical path in a discrete resonator can be readily adjusted to tune the resonant frequency. Unfortunately, discrete resonators are subject to variations in the length of the optical path due to mechanical instability of the mirror mounts.

A monolithic resonator comprises a single block of transparent material having reflecting facets that serve as the mirrors. Usually, the material is strained by changing its temperature. Alternatively, the optical path length of a monolithic oscillator can be adjusted by a piezoelectric element mounted to uniformly strain the entire block in a plane parallel to the plane of the optical path. Such a configuration is described in U.S. Pat. No. 4,829,532 issued May 9, 1989 to Kane and assigned to the assignee of the present application. The monolithic resonator is extremely rugged and resistant to mechanical perturbation. Unfortunately the monolithic resonator is difficult to manufacture. Furthermore, piezoelectric elements provide only a limited range of motion to the block and, therefore, only a limited range of tuning of the resonator frequency.

Semi-monolithic resonators are often used in OPO's. In a semi-monolithic OPO, a block of non-linear material having at least one reflecting facet is mounted separate from a mirror to form a resonator. The resonator is tuned by adjusting the distance between the mirror and the block of non-linear optical material. The optical pump within the resonator couples with the non-linear optical material, which produces an output signal as a result. This arrangement is more adjustable than the monolithic resonator and more rugged than the discrete resonator. Unfortunately, the semi-monolithic resonator has two extra surfaces that introduce losses and is difficult to fabricate.

Quasi-monolithic resonators are described in N. Uehara, E. K. Gustafson, M. M. Fejer and R. L. Byer in "Modeling of Efficient Mode Matching and Thermal-Lensing Effect on a Laser-Beam Coupling Into a Mode Cavity Cleaner", Proceedings of the International Society for Optical Engineering vol 2989, p. 57–67. A typical quasi-monolithic optical resonator 100 of the prior art is depicted in FIG. 1. The resonator generally comprises a monolithic structure 101, three mirrors M1, M2, M3, and a piezoelectric element 104. Structure 101 is made from a single block of a low thermal expansion material, such as Zerodur™. Holes drilled in the block form an optical path 110. Mirrors M1, M2, M3, are fixed to the structure 101 and configured to deflect light back and forth along optical path 110. A large optical signal builds up within structure 101 when a length of optical path 110 matches an integral number of wavelengths of light from a source such as a laser. To tune structure 101 one of the mirrors, e.g., mirror M3, is mounted to piezoelectric element 104, which is mounted to structure 101. A voltage applied to piezoelectric element 104 moves mirror M3 by a small amount. This method works well enough for rapid mirror movements of about 1 micron or less. However, for long range adjustment, e.g., about 1 to 10 microns or more, several piezoelectric elements must be stacked together or a large voltage, e.g. greater than 100 volts, must be applied. The resulting structure tends to be long, fragile and unstable.

There is a need, therefore, for a robust optical resonator that is continuously and finely tunable over a broad range.

OBJECTS AND ADVANTAGES

Accordingly, it is a primary object of the present invention to provide a mechanically robust optical resonator capable of continuous and fast tuning over a broad range of wavelengths. It is a further object of the invention to incorporate such a resonator into an optical parametric oscillator.

SUMMARY

These objects and advantages are attained by a broadly tunable quasi-monolithic optical resonator. The resonator comprises a piezoelectric element attached to a quasi-monolithic structure. The quasi-monolithic structure defines an optical path. The optical path defines a cavity. At least two mirrors attached to the structure are configured to deflect light along the optical path. The piezoelectric element controllably strains the quasi-monolithic structure to change a length of the optical path by at least about 0.01 micron. A first feedback loop coupled to the piezoelectric element provides "fine" control over the cavity length. A preferred embodiment of the resonator includes a thermally actuated spacer attached to the structure and second mirror attached to the spacer. The thermally actuated spacer adjusts the cavity length by up to about 20 microns. The spacer typically includes a thermally responsive block, a heater element and perhaps a temperature sensor. A second feedback loop coupled to the sensor and heater provides a "coarse" control over the cavity length.

Another embodiment of the invention provides a quasi-monolithic optical parametric oscillator (OPO). This embodiment includes a non-linear optical element along an optical path within a quasi-monolithic resonator structure. The structure is strained by a piezoelectric element for fine control and one mirror is mounted to a thermally actuated spacer for coarse control. The non-linear element is typically temperature controlled. Such an OPO configuration is broadly tunable and capable of mode-hop free operation for periods of 24 hours or more.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Quasi-Monolithic Resonator

The inventors have developed a general-purpose resonator architecture based on a "quasi-monolithic" structure.

This design can be used for an OPO cavity as well as for an external second harmonic generation (SHG), cavity, if that design choice is made. Alternatively, the resonator may be used for third or fourth harmonic generation, etc.

Figure 1:
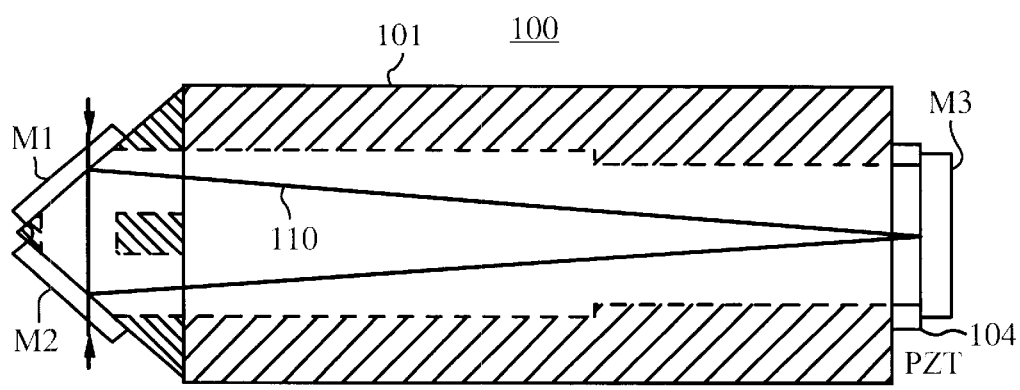
FIG. 1 depicts an optical resonator of the prior art.
Figure 2:
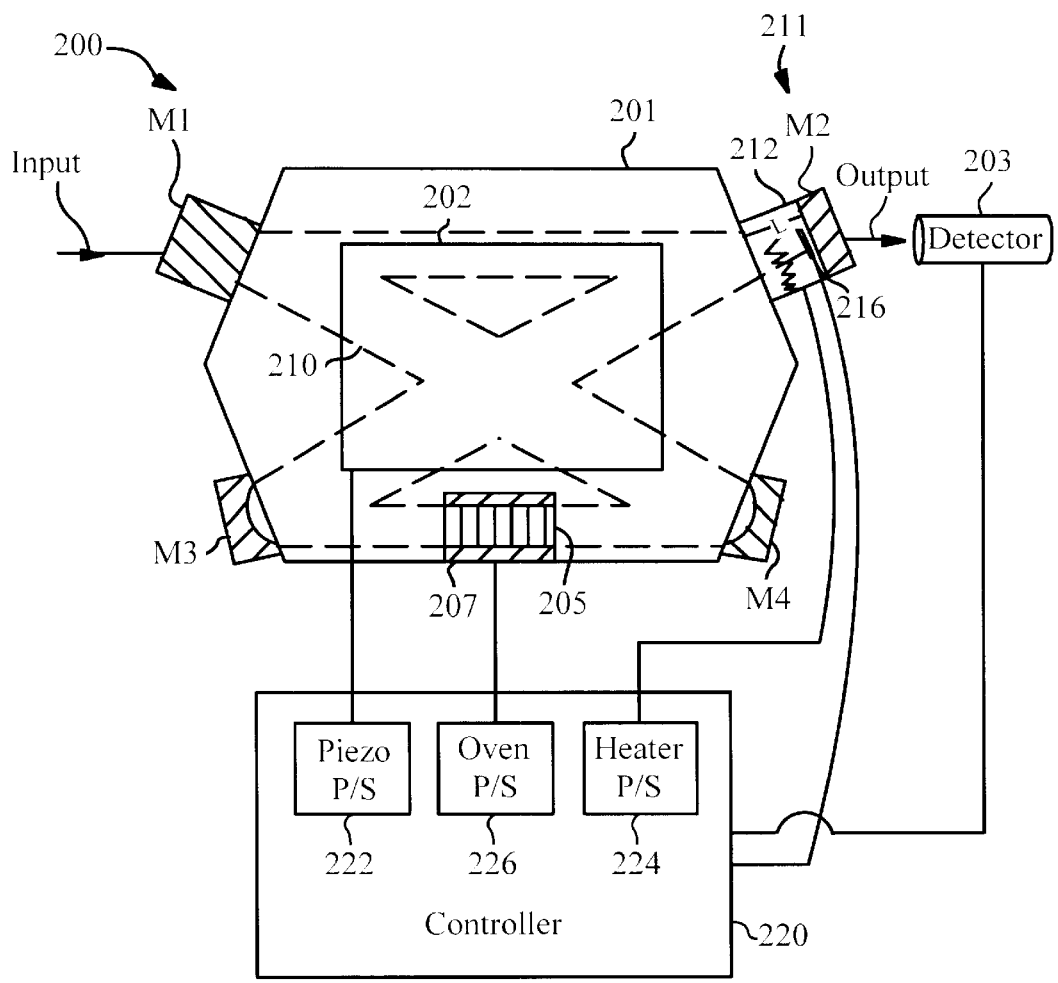
FIG. 2 depicts a schematic diagram of an embodiment of a quasi-monolithic optical resonator according to the present invention.

FIG. 2 depicts a schematic diagram an embodiment of a quasi-monolithic resonator 200 of the present invention. The resonator 200 generally comprises a cavity structure 201 and one (or more) piezoelectric element(s) 202. Typically two piezoelectric elements 202 are attached to structure 201, on at opposite surfaces. Structure 201 is preferably formed from a single block of a substantially rigid, low-thermal-expansion material. Suitable materials include Invar™, a nickel-steel alloy, ULE™ Glass, and Zerodur™, a glass-ceramic. The thermal expansion coefficients for these materials are typically zero, plus or minus manufacturing tolerances. Another suitable material, fused silica (SiO2), has a thermal coefficient of $0.5 \times 10^{-6}$ per ° C. Small beam tubes 210 drilled out of structure 201 define an optical path 210 and prevent air currents from perturbing the optical path length of the cavity.

In FIG. 2, by way of example, four mirrors, M1, M2, M3, M4 are attached to structure 201. The mirrors deflect light along optical path 210, which defines a resonant cavity. This type of construction is referred to herein as quasi-monolithic because the beam path is defined by a monolithic structure but the reflecting surfaces are separate elements attached to the monolithic structure. Input light may be provided from an external source (not shown). In the case of a laser, the light is generated internally to the cavity.

Generally two or more mirrors are used to direct light along an optical path. Two or more mirrors may be used in a standing wave cavity or three or more mirrors may be used in a ring cavity configuration. The optical path 210 depicted in FIG. 2 defines a so-called "bowtie" ring cavity, a type of 4-mirror cavity. By way of example, the cavity is uni-directional, i.e., light travels in only one direction. Those skilled in the art will be able to devise many other optical path configurations, having two or more reflecting surfaces, including triangle, ring, and Fabry-Perot resonators, etc. without departing from the scope of the present invention.

Usually, one or more of the mirrors is partially reflecting so that light may be coupled into or out of the resonator 200. For example, input (pump) light is received at mirror M1 and output (signal) light is transmitted at mirror M4. The output light may be coupled to a detector 203 or some other optical element depending on the application.

Two piezoelectric elements 202 are bonded to structure 201, e.g., by an adhesive or solder or welding. Piezoelectric elements 202 enable rapid tuning of the total length of all optical paths 210. A suitable piezoelectric element is a PZT5H manufactured by Morgan Matroc Inc. of Bedford, Ohio. A power supply 222 is coupled to piezoelectric elements 202. A voltage, provided by power supply 222 applied to piezoelectric elements 202 establishes an electric field, which expands or contracts piezoelectric elements 202 and structure 201 in a plane substantially parallel to optical path 210. Thus, the amount of voltage applied to piezoelectric elements 202 may be used to control the length of optical path 210. Piezoelectric elements typically provide a rapid response, e.g. faster than 1 ms, and can tune the resonant wavelength of resonator 200 by up to approximately ±1 micron using voltages of up to 300 V.

Mirrors M1, M3, and M4 are mounted directly to 201. The mirrors are in physical contact with and glued to structure 201, e.g., face-forward around their perimeters, preventing relative motion or tilting. In a preferred embodiment, one mirror M2 is mounted to a thermally actuated spacer 211 with parallel surfaces attached to 201. Spacer 211 typically includes a stand 212 of length L, which is attached to structure 201. Stand 212 is temperature controlled to allow slow thermal tuning of the length of optical path 210 over a broad range, e.g., to compensate for a drift in the frequency of input light. For example, spacer 211 includes a heater element 214, such as a resistive heater, in thermal contact with stand 212. Alternatively heater element 214 may be replaced by a thermoelectric cooler (TEC) element. A temperature sensor 216 such as a thermocouple, resistance thermometer, thermistor, or the like, may optionally provide a feedback signal for monitoring and controlling the temperature of stand 212.

Preferably, stand 212 is made from a substantially rigid, thermally conductive, thermally responsive material having a suitable coefficient of thermal expansion. Depending on the material, stand 212 either expands or contracts when heated. Suitable materials include aluminum and almost any other metal (except Invar™) and ceramics such as $Al_2O_3$. Heat supplied by heater element 214 changes L by an amount depending on the value of L at some reference temperature and the thermal expansion coefficient of the material of stand 212. If the coefficient of thermal expansion is too small, a very large temperature change will be required for a given change in L. On the other hand, if the coefficient of thermal expansion is too large, small and difficult to control fluctuations in temperature could induce significant optical path length changed in the resonator 200. The temperature of stand 212 can generally be controlled to within ±0.1° C. without difficulty. It is generally more difficult to control the temperature to within ±0.01° C. A total temperature range of 10° C. is relatively easy to obtain. A temperature range of up to 100° C. may be obtained with difficulty. Spacer 211 provides a "coarse" tuning of resonator 200 over a larger range than the "fine" tuning provided by piezoelectric elements 202. Generally, piezoelectric elements 202 provide at least one wavelength (about 1 micron) range of tuning of the optical path length. Alternatively, piezoelectric elements 202 provide less than one wavelength of tuning range and spacer 211 provides additional tuning up to one wavelength and more.

Preferably the resolution for the "coarse" tuning is smaller than the range covered by the "fine" tuning so that the fine-tuning can compensate for small changes in L due to uncontrolled temperature fluctuations. For example, in a specific embodiment of spacer 211, stand 212 comprises an aluminum block with L approximately equal to 1 cm. Heater element 214 is a resistive heater, which is coupled to a power supply 224. Such a configuration allows for about 1 micron of motion for a temperature change of about 3° C. Those skilled in the art will recognize that the length L can be calibrated to the signal from the temperature sensor 216. If the temperature of the block can be controlled to within 0.1° C. by heater element 214, the value of L can be controlled to within about 0.3 microns. A range of fine control of about 1 micron with piezoelectric element 202 is more than adequate to compensate for changes in L due to temperature fluctuations of less than 0.1° C.

Piezoelectric element 202 and/or thermally actuated spacer 211 may tune resonator 220 under the control of a controller 220. Power supplies 222, 224 temperature sensor 216, and signal detector 203 are coupled to controller 220. For example, controller 220 implements a low pass filtered feedback loop to control power supply 224 for "coarse" tuning and a high pass filtered feed back loop to control power supply 222 for fine tuning. The feedback loops generally adjust the output of power supplies 222 and 224 in a manner that optimizes the signal at detector 203. Additionally, the "coarse" feedback loop may be configured to correct for a known drift in the frequency of the input light. Such a configuration typically exhibits far more dynamic range than is necessary for the system to survive room temperature changes, pump laser tuning (~10 GHz) or acoustic-type environmental perturbations. Those skilled in the art will be able to design high-pass (piezo) and low-pass (thermal actuator) loops to maintain a tight lock to the frequency of the input light. Such feedback loops may be implemented in hardware or software or some combination of both.

When resonator 200 is to be used as an optical parametric oscillator a nonlinear element 205 is placed along some portion of optical path 210. Since non-linear optical properties are generally temperature dependent, non-linear element 205 usually resides in a demountable oven 207. The temperature of oven 207 and non-linear element 205 is controlled by an oven power supply 226. Oven power supply 226 is operable under the control of a controller 220 as described above with respect to power supplies 222 and 224. Controller 220 may implement a suitable feedback loop for power supply 226 to control the idler or signal outputs of non-linear element 205.

The quasi-monolithic resonator of the present invention may be incorporated into a laser if non-linear element 205 is replaced by a gain medium, such as Nd:YAG or other suitable material. A suitable laser incorporating a unidirectional ring oscillator is described in commonly assigned U.S. patent application Ser. No. 09/452,938, filed on Dec. 12, 1999 and titled "Mode-Hop-Free Single Frequency Solid State Laser", which is incorporated herein by reference.

Quasi-Monolithic OPO

Resonator 200 can be used as a frequency filter, spatial filter, temporal filter or mode cleaner for a larger optical system. Additionally, resonator 200 may be used as a ring-down cavity (RDC) for cavity ring down spectroscopy (CRDS). A non-linear crystal may optionally be inserted into the cavity structure so that the resonator can be used for optical frequency conversion. Nonlinear optical frequency conversion is often used to extend the spectral range of available laser sources to shorter (via harmonic generation) and longer (via parametric processes) wavelengths. Suitable non-linear materials include Lithium Niobate ($LiNbO_3$), Lithium Tantalate ($LiTaO_3$), Lithium Borate ($LiBO_3$) PPLN, PPLT MgO:PPLN, LBO, KTP, PPKTP, RTA, PPRTA, and the like.

By inserting non-linear optical crystal 205 into beam path 210, resonator 200 effectively becomes an optical parametric oscillator (OPO). The present invention provides a pump-resonant optical parametric oscillator (PROPO), which is very compact. One embodiment of the OPO hardware occupies a volume of less than 3 cu. in. Embodiments of the PROPO are very efficient, approaching 50%, and capable of operating with low or high input powers, i.e., from less than 100 mW to greater than 10 Watts. Embodiments of the PROPO inherently generate a low-noise, single-frequency CW output.

An example of an externally resonant frequency conversion device is frequency-doubled non-planar ring oscillator (NPRO) laser model 142, manufactured by Lightwave Electronics of Mountain View, Calif. Due to the efficient pump-resonant architecture, IR-green conversion efficiencies exceeding 50% are routinely achieved with this device. Such a laser could readily be configured to take advantage of the benefits of embodiments of the present invention.

Embodiments of the resonator of the present invention operating as an OPO at several hundred mW of output power, have maintained lock for >24 hours without loss of power. Alternative embodiments of control electronics include microprocessor/software control of variables such as cavity frequency, idler and signal power, as well as lock acquisition.

There are several possible cavity-locking algorithms. One preferred method is a so-called "Power Lock" algorithm. In this method, the pump laser (1.064 µ) has its frequency just off the resonance peak of the external cavity. This provides a slope, which a simple feedback loop can maintain. Additional software scans the cavity length to find the resonance and achieve lock. A benefit is that the output power is constant, since the cavity is tuned to always provide the same amount of output.

Figure 3:
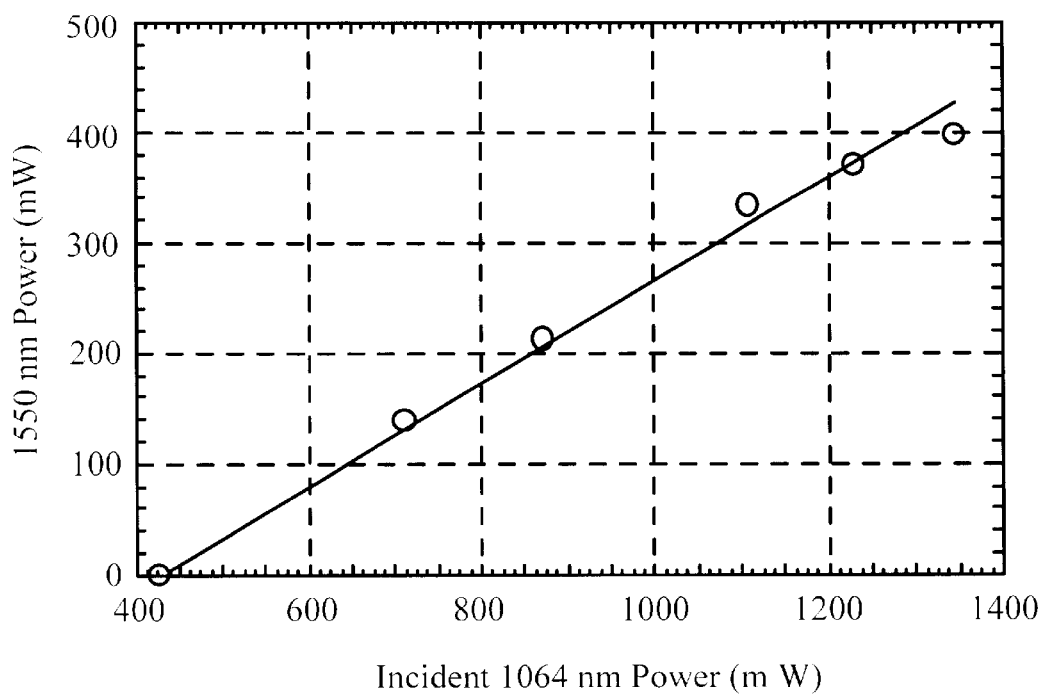
FIG. 3 depicts a graph of power generated near 1550 nm as a function of 1064 nm incident pump power for an optical parametric oscillator according to an embodiment of the present invention.

FIG. 3 depicts a graph of power generated near 1550 nm as a function of the incident pump power at 1064 nm for a resonator according to an embodiment of the present invention. In this device, 5% input coupler and 3% output coupler were used. Greater output coupling would result in a higher threshold, but also a larger slope efficiency than the 40% indicated here.

It will be clear to one skilled in the art that the above embodiment may be altered in many ways without departing from the scope of the invention. For example, the quasi-monolithic resonator may be configured to operate as a frequency doubler, sum-frequency generator, frequency difference generator, etc. Accordingly, the scope of the invention should be determined by the following claims and their legal equivalents.

What is claimed is:

1. An optical resonator, comprising:
a) a cavity structure formed from a single block of a substantially rigid, low-thermal-expansion material and configured to define an optical path, said low-thermal-expansion material is selected from the group consisting of nickel-steel alloys, ultra low expansion glass, glass-ceramics, and fused silica characterized as having zero or substantially near zero thermal expansion coefficients;
b) at least one mirror attached to the cavity structure and configured to deflect light along the optical path, which defines a resonant cavity; and
c) at least one piezoelectric element attached to the cavity structure and configured to controllably strain the cavity structure in a plane substantially parallel to the optical path to change a total optical path length thereof.

2. The resonator of claim 1 wherein the piezoelectric element is configured to adjust the total path length by at least about 0.01 micron.

3. The resonator of claim 1 wherein the piezoelectric element is configured to adjust the total path length at a frequency of at least 1 kHz.

4. The resonator of claim 1 further comprising a feedback loop coupled to the piezoelectric element.

5. The resonator of claim 1 wherein the at least one mirror comprises three mirrors.

6. The resonator of claim 1 further comprising:
f) a non-linear optical element disposed along the optical path.

7. The resonator of claim 6 configured as a second harmonic generator.

8. The resonator of claim 6 further comprising means for controlling a temperature of the non-linear optical element.

9. An optical resonator, comprising:
a) a cavity structure formed from a single block of a substantially rigid, low-thermal-expansion material and configured to define an optical path;
b) at least one mirror attached to the cavity structure and configured to deflect light along the optical path, which defines a resonant cavity;
c) at least one piezoelectric element attached to the cavity structure for controllably straining the cavity structure in a plane substantially parallel to the optical path;
d) a thermally actuated spacer attached to the cavity structure; and
e) a second mirror attached to the thermally actuated spacer wherein the thermally actuated spacer and the piezoelectric element are configured to, individually or together, controllably change a total optical path length.

10. The resonator of claim 9 wherein the thermally actuated spacer is configured to adjust the total path length by between about 0 and about 20 microns.

11. The resonator of claim 9 wherein the thermally actuated spacer includes:
a) a block made of a thermally responsive material; and
b) means for controlling the temperature of the block.

12. The resonator of claim 11 further comprising a feedback circuit coupled to the temperature controlling means.

13. An optical parametric oscillator, comprising:
a) a cavity structure formed from a single block of a substantially rigid, low-thermal-expansion material and configured to define an optical path;
b) a non-linear optical element disposed within the cavity structure along the optical path;
c) at least one mirror attached to the cavity structure and configured to deflect light along the optical path, which defines a resonant cavity;
d) a thermally actuated spacer attached to the cavity structure; and
e) at least one piezoelectric element attached to the cavity structure, wherein the thermally actuated spacer and the piezoelectric element are configured to, individually or together, controllably change a total optical path length.

14. The optical parametric oscillator of claim 13 wherein the non-linear optical element includes Lithium Niobate (LiNbO$_3$), Lithium Tantalate (LiTaO$_3$), Lithium Borate (LiBO$_3$) PPLN, PPLT MgO:PPLN, PPMgO:LN, LBO, KTP, PPKTP, RTA, BBO or PPRTA.

15. The optical parametric oscillator of claim 13 further comprising a feedback loop coupled to the piezoelectric element.

16. The optical parametric oscillator of claim 13 wherein the piezoelectric element is configured to adjust the total optical path length by at least about 0.01 micron.

17. The optical parametric oscillator of claim 13 wherein the piezoelectric element is configured to adjust the total optical path length at a frequency of at least 1 kHz.

18. The optical parametric oscillator of claim 13, further comprising
f) a second mirror attached to the thermally actuated spacer.

19. The optical parametric oscillator of claim 18 wherein the second mirror is a first flat mirror.

20. The optical parametric oscillator of claim 19 wherein the at least one mirror includes two spherical mirrors and a second flat mirror.

21. The optical parametric oscillator of claim 18 wherein the thermally actuated spacer is configured to adjust the total optical path length by between about 0 and about 20 microns.

22. The optical parametric oscillator of claim 18 wherein the thermally actuated spacer includes:
   a) an block made of a thermally responsive material; and
   b) means for controlling the temperature of the block.

23. The optical parametric oscillator of claim 22 further comprising a feedback circuit coupled to the temperature controlling means.

24. The optical parametric oscillator of claim 13, further comprising a source of pump light wherein the pump light is resonated by the cavity.

25. The optical parametric oscillator of claim 13 further comprising a tuning element within the cavity.

26. A laser, comprising:
   a) a cavity structure formed from a single block of a substantially rigid, low-thermal-expansion material and configured to define an optical path;
   b) a gain medium disposed along the optical path;
   c) a pump source coupled to the gain medium;
   d) at least one mirror attached to the cavity structure and configured to deflect light along the optical path, which defines a resonant cavity;
   e) a thermally actuated spacer attached to the cavity stricture; and
   f) at least one piezoelectric element attached to the cavity structure, wherein the thermally actuated space and the piezoelectric element are configured to, individually or together, controllably change a total optical path length.

27. The laser of claim 26, wherein the laser is a unidirectional ring oscillator.

28. A harmonic generator, comprising:
   a) a cavity structure formed from a single block of a substantially rigid, low-thermal-expansion material and configured to define an optical path;
   b) a non-linear optical element disposed within the cavity structure along the optical path;
   c) at least one mirror attached to the structure and configured to deflect light along the optical path, which defines a resonant cavity;
   d) a thermally actuated spacer attached to the cavity structure; and
   e) at least one piezoelectric element attached to the cavity structure, wherein the thermally actuated spacer and the piezoelectric element are configured to, individually or together, controllably change a total optical path length.

29. The harmonic generator of claim 28 wherein the non-linear optical element includes Lithium Niobate ($LiNbO_3$), Lithium Tantalate ($LiTaO_3$), Lithium Borate ($LiBO_3$) PPLN, PPLT MgO:PPLN, PPMgO:LN, LBO, KTP, PPKTP, RTA, BBO or PPRTA.

30. The harmonic generator of claim 28 further comprising a feedback loop coupled to the piezoelectric element.

31. The harmonic generator of claim 28 wherein the piezoelectric element is configured to adjust the total optical path length by at least about 0.01 micron.

32. The harmonic generator of claim 28 wherein the piezoelectric element is configured to adjust the total optical path length at a frequency of at least 1 kHz.

33. The harmonic generator of claim 28, further comprising
   f) a second mirror attached to the thermally actuated spacer.

34. The harmonic generator of claim 33 wherein the second mirror is a first flat mirror.

35. The harmonic generator of claim 34 wherein the at least one mirror includes two spherical mirrors and a second flat mirror.

36. The harmonic generator of claim 33 wherein the thermally actuated spacer is configured to adjust the total optical path length by between about 0 and about 20 microns.

37. The harmonic generator of claim 33 wherein the thermally actuated spacer includes:
   c) an block made of a thermally responsive material; and
   d) means for controlling the temperature of the block.

38. The harmonic generator of claim 37 further comprising a feedback circuit coupled to the temperature controlling means.

39. The harmonic generator of claim 28, further comprising a source of pump light wherein the pump light is resonated by the cavity.

40. The harmonic generator of claim 28 further comprising a tuning element within the cavity.

* * * * *